(No Model.)
E. WESTON.
INCANDESCENT LAMP.
No. 258,966.        Patented June 6, 1882.
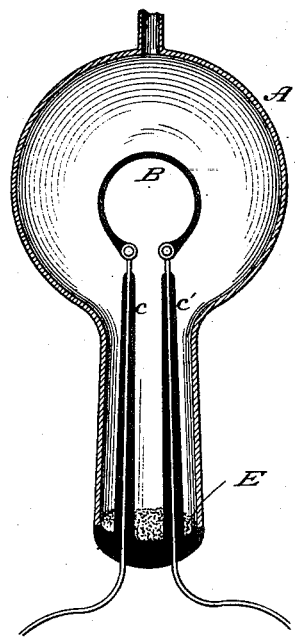
Attest:
R. F. Barnes
E. L. Dick
Inventor:
Edward Weston
by his attorney
Parker W. Page.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

INCANDESCENT LAMP.

SPECIFICATION forming part of Letters Patent No. 258,966, dated June 6, 1882.

Application filed July 12, 1881. (No model.)

*To all whom it may concern:*

Be it known that I, EDWARD WESTON, a resident of Newark, in the county of Essex and State of New Jersey, have invented certain new and useful Improvements in Incandescent Lamps, of which the following is a specification.

The lamps to which this invention relates are those in which a conductor of carbon or similar substance is used, the said conductor being mounted on metallic wires sealed into a transparent receiver from which the air has been as far as possible exhausted. The object of the invention is to produce a more perfect vacuum in the lamps than can be accomplished by the mechanical appliances heretofore used, and by this means to increase the durability of the lamp, as it is well known that the carbon conductors rapidly disintegrate when heated in the presence of even a trace of oxygen or air.

In carrying out my invention I make use of any ordinary form of incandescent lamp, and in the globe, before it is finally sealed, I introduce a small quantity of a substance possessing the property of absorbing, under certain conditions, air. Such a substance is thorina or thoria, the oxide of the metal thorium, which is used in the following manner: A small quantity being introduced into the globe, the latter is connected with the air-exhaust apparatus, and while the air is being withdrawn the thorina is strongly heated. When the exhaustion has been carried as far as possible the heat is withdrawn, the globe detached from the exhaust apparatus and hermetically sealed. On cooling, the thorina absorbs the remaining gas or air with such avidity as to leave an almost perfect vacuum in the globe. The substance thoria or thorina which I utilize for this purpose is, as above stated, the only known oxide of thorium, one of the earth metals.

The preparation of thorina from minerals containing thorium may be effected in various ways, according to the nature of the substances with which it is associated. From thorite it may be separated by treating the finely-pulverized ore with hydrochloric acid, evaporating to dryness, digesting the residue with weak acid in order to separate the silica, filtering and treating the solution with sulphydric acid to separate lead and tin. The resulting solution contains the thorium, which may be precipitated as a hydrate by ammonia and the precipitate ignited. The resulting product is oxide of thorium, which may be used in the manner directed. Should much iron, manganese, or uranium be present, these bodies may be separated by redissolving the hydrate in weak hydrochloric acid and the thorium precipitated as potassio-thorinic sulphate by treatment with a hot saturated solution of neutral potassic sulphate. The precipitate thus obtained is dissolved in hot water and treated with ammonia and the resulting precipitate ignited as before. Thorina, when used as above described, is a powerful absorbent of the residual gas in an imperfect vacuum, and as such forms a valuable element in the manufacture of durable incandescent lamps.

The drawing hereto annexed represents an ordinary form of lamp containing the air-absorbent.

A is the globe, which should be of such shape as to form a recess or chamber for containing the absorbent; B, the carbon attached to conductors C C'. E is a small quantity of powdered thorina, which, as stated above, is to be introduced into the globe previously to attaching the same to the air-exhaust apparatus, heated while the withdrawal of air is going on, and then allowed to cool when the lamp has been detached and sealed in the usual manner.

The portion of the globe or lamp in which the air-absorbent is contained is to some extent immaterial, and so, therefore, without limiting myself to the location within the globe of the said absorbent—that is to say, whether it be above or below the carbon conductor, or so that it will be affected by or protected from the heat of the same when incandescent—

What I claim as of my invention is—

An electric lamp consisting of a transparent, exhausted, and hermetically-sealed receiver, surrounding a conductor capable of being rendered incandescent, and containing a small quantity of an air-absorbent substance, such as thorina, as and for the purpose set forth.

In testimony whereof I have hereunto set my hand.

EDWARD WESTON.

Witnesses:
W. STANLEY, Jr.,
HENRY HINE.